(12) United States Patent
Newswanger

(10) Patent No.: US 11,846,586 B2
(45) Date of Patent: *Dec. 19, 2023

(54) COMMON AXIS FOR OPTICAL AND ACOUSTIC SIGNALS

(71) Applicant: Open Water Internet Inc., San Francisco, CA (US)

(72) Inventor: Craig Newswanger, Oakland, CA (US)

(73) Assignee: Open Water Internet, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/710,869

(22) Filed: Mar. 31, 2022

(65) Prior Publication Data

US 2022/0228980 A1 Jul. 21, 2022

Related U.S. Application Data

(63) Continuation of application No. 16/912,450, filed on Jun. 25, 2020, now Pat. No. 11,320,370.

(60) Provisional application No. 62/867,163, filed on Jun. 26, 2019.

(51) Int. Cl.
*G01N 21/47* (2006.01)
*H04N 5/33* (2023.01)
*G02F 1/33* (2006.01)

(52) U.S. Cl.
CPC ............. *G01N 21/47* (2013.01); *G02F 1/33* (2013.01); *H04N 5/33* (2013.01); *G01N 2021/4709* (2013.01)

(58) Field of Classification Search
CPC ........... G01N 21/47; G01N 2021/4709; G01N 21/05; G01N 15/1434; G01N 15/147; G01N 15/1484; G01N 21/0303; G01N 21/6458; G01N 2021/6482; G01N 2015/144; G01N 2021/0307; G02F 1/33; H04N 5/33; G02B 3/12; G02B 1/06; G02B 21/16; G02B 27/0076; B01L 3/502715; B01L 2300/0654
USPC ................................ 356/446, 517, 124–134
See application file for complete search history.

(56) References Cited

U.S. PATENT DOCUMENTS

| | | |
|---|---|---|
| 3,573,362 A | 4/1971 | Burchardt |
| 4,049,350 A * | 9/1977 | Bruck .................... G01N 21/87 356/30 |
| 6,172,760 B1 | 1/2001 | Son et al. |
| 6,608,774 B1 | 8/2003 | Rentzepis |

(Continued)

OTHER PUBLICATIONS

Arridge et al. Nonuniqueness in diffusion-based optical tomography, Optics Letters, Jun. 1, 1998, vol. 23, No. 11, pp. 882-884.

(Continued)

*Primary Examiner* — Isiaka O Akanbi
(74) *Attorney, Agent, or Firm* — FREESTONE INTELLECTUAL PROPERTY LAW PLLC; Aaron J. Visbeek

(57) ABSTRACT

An apparatus includes a glass element, a fluid, an illumination source, and an ultrasound emitter. The glass element is immersed in the fluid. The illumination source emits light. The ultrasound emitter is configured to direct an ultrasonic signal through the fluid to the glass element. The glass element is configured to reflect the ultrasonic signal along a substantially similar path as an optical path that the light propagates along.

20 Claims, 6 Drawing Sheets

(56) References Cited

U.S. PATENT DOCUMENTS

| | | |
|---|---|---|
| 6,956,650 B2 | 10/2005 | Boas et al. |
| 7,119,906 B2 | 10/2006 | Pepper et al. |
| 7,460,248 B2 | 12/2008 | Kurtz et al. |
| 7,551,809 B2 | 6/2009 | Taira et al. |
| 7,610,082 B2 | 10/2009 | Chance |
| 7,647,091 B2 | 1/2010 | Ntziachristos et al. |
| 7,728,986 B2 | 6/2010 | Asker et al. |
| 7,804,070 B1 | 9/2010 | Pan et al. |
| 7,821,640 B2 | 10/2010 | Koenig et al. |
| 7,822,468 B2 | 10/2010 | Stamnes et al. |
| 7,826,878 B2 | 11/2010 | Alfano et al. |
| 7,898,649 B2 | 3/2011 | Masumura |
| 7,928,896 B2 | 4/2011 | Jin et al. |
| 7,965,389 B2 | 6/2011 | Silva et al. |
| 7,983,740 B2 | 7/2011 | Culver et al. |
| 8,014,847 B2 | 9/2011 | Shastri et al. |
| 8,120,784 B2 | 2/2012 | Silva et al. |
| 8,170,651 B2 | 5/2012 | Lorenzo et al. |
| 8,239,006 B2 | 8/2012 | Zhu et al. |
| 8,263,947 B2 | 9/2012 | Silva et al. |
| 8,289,502 B2 | 10/2012 | Yoshida |
| 8,326,567 B2 | 12/2012 | Masumura |
| 8,330,642 B2 | 12/2012 | Jin et al. |
| 8,355,131 B2 | 1/2013 | Bakker et al. |
| 8,357,915 B2 | 1/2013 | Guyon et al. |
| 8,374,409 B2 | 2/2013 | Jochemsen et al. |
| 8,416,421 B2 | 4/2013 | Wang et al. |
| 8,450,674 B2 | 5/2013 | Yang et al. |
| 8,451,450 B2 | 5/2013 | Heng |
| 8,520,921 B2 | 8/2013 | Ziegler et al. |
| 8,525,998 B2 | 9/2013 | Yaqoob et al. |
| 8,527,242 B2 | 9/2013 | Granot et al. |
| 8,531,662 B2 | 9/2013 | Mark |
| 8,563,932 B2 | 10/2013 | Fang et al. |
| 8,634,077 B2 | 1/2014 | Hu et al. |
| 8,649,015 B2 | 2/2014 | Ichihara et al. |
| 8,717,574 B2 | 5/2014 | Yang et al. |
| 8,814,795 B2 | 8/2014 | Derode et al. |
| 8,817,255 B2 | 8/2014 | Masumura |
| 8,830,573 B2 | 9/2014 | Cui et al. |
| 8,847,175 B2 | 9/2014 | Laidevant et al. |
| 8,917,442 B2 | 12/2014 | Baym et al. |
| 8,937,284 B2 | 1/2015 | Fang et al. |
| 8,954,130 B2 | 2/2015 | Masumura |
| 8,976,433 B2 | 3/2015 | Masumura |
| 9,012,869 B2 | 4/2015 | Andersson-Engels et al. |
| 9,036,970 B2 | 5/2015 | Guyon et al. |
| 9,037,216 B2 | 5/2015 | Hielscher et al. |
| 9,057,695 B2 | 6/2015 | Masumura |
| 9,131,851 B2 | 9/2015 | Fukutani et al. |
| 9,134,229 B2 | 9/2015 | Lesage et al. |
| 9,179,842 B2 | 11/2015 | Nakaji et al. |
| 9,207,171 B2 | 12/2015 | Nadakuditi et al. |
| 9,234,841 B2 | 1/2016 | Wang et al. |
| 9,282,932 B2 | 3/2016 | Kudo et al. |
| 9,297,752 B2 | 3/2016 | Shimokawa et al. |
| 9,304,490 B2 | 4/2016 | Masumura |
| 9,313,423 B2 | 4/2016 | Wang et al. |
| 9,335,604 B2 | 5/2016 | Popovich et al. |
| 9,335,605 B2 | 5/2016 | Wang et al. |
| 9,341,569 B2 | 5/2016 | Hooft et al. |
| 9,354,166 B2 | 5/2016 | Judkewitz et al. |
| 9,373,020 B2 | 6/2016 | Kudo et al. |
| 9,407,796 B2 | 8/2016 | Dinten et al. |
| 9,427,213 B2 | 8/2016 | Suzuki et al. |
| 9,480,425 B2 | 11/2016 | Culver et al. |
| 9,486,142 B2 | 11/2016 | Hielscher et al. |
| 9,488,574 B2 | 11/2016 | Koehler et al. |
| 9,509,956 B2 | 11/2016 | Piestun et al. |
| 9,622,663 B2 | 4/2017 | Fang et al. |
| 9,689,797 B2 | 6/2017 | Sun et al. |
| 9,724,489 B2 | 8/2017 | Barbour et al. |
| 9,730,649 B1 | 8/2017 | Jepsen |
| 9,750,413 B2 | 9/2017 | Sandusky et al. |
| 10,420,469 B2 | 9/2019 | Sobek et al. |
| 2010/0016732 A1 | 1/2010 | Wells et al. |
| 2010/0268042 A1* | 10/2010 | Wang ................ A61B 5/14546 73/587 |
| 2012/0052947 A1 | 3/2012 | Yun |
| 2012/0070817 A1 | 3/2012 | Wang et al. |
| 2014/0009808 A1 | 1/2014 | Wang et al. |
| 2014/0081096 A1 | 3/2014 | Baym et al. |
| 2014/0114181 A1 | 4/2014 | Wu et al. |
| 2014/0303473 A1 | 10/2014 | Nanaumi |
| 2015/0182121 A1 | 7/2015 | Barbour et al. |
| 2015/0238092 A1 | 8/2015 | Masumura |
| 2015/0241342 A1 | 8/2015 | Zhou et al. |
| 2015/0346027 A1 | 12/2015 | Khare et al. |
| 2015/0351635 A1 | 12/2015 | Cerussi et al. |
| 2015/0359478 A1* | 12/2015 | Eyal ................ A61B 5/0095 600/407 |
| 2016/0085135 A1 | 3/2016 | Park et al. |
| 2016/0157723 A1 | 6/2016 | Kanick et al. |
| 2016/0216503 A1 | 7/2016 | Kim et al. |
| 2016/0262723 A1 | 9/2016 | Zhu |
| 2016/0356707 A1* | 12/2016 | Sugimoto .......... G01M 11/0285 |
| 2016/0363527 A1 | 12/2016 | Ruan et al. |
| 2017/0118423 A1 | 4/2017 | Zhou et al. |
| 2017/0163946 A1 | 6/2017 | Komanduri et al. |
| 2017/0168565 A1 | 6/2017 | Cohen et al. |
| 2017/0202633 A1 | 7/2017 | Liu |
| 2017/0205385 A1* | 7/2017 | Prystupa ................ G01N 21/65 |
| 2017/0230555 A1 | 8/2017 | Tabirian et al. |
| 2017/0231501 A1 | 8/2017 | Culver et al. |
| 2018/0070891 A1 | 3/2018 | Jepsen |
| 2019/0008388 A1 | 1/2019 | Ando et al. |
| 2019/0150745 A1 | 5/2019 | Sobek et al. |

OTHER PUBLICATIONS

Freund et al. Memory Effects in Propagation of Ooptical Waves through Disordered Media, Physical Review Letters, Nov. 14, 1988, vol. 61, No. 20, pp. 2328-2331.

Goodman et al. Wavefront-Reconstruction Imaging Through Random Media, Jun. 15, 1966, vol. 8, No. 12, pp. 311-313.

Hofmann et al. Differential light detector, Rev. Sci. Instrum, Feb. 1979, vol. 50, No. 2, pages 249-252.

Peng et al. Low loss liquid crystals for infrared applications, Liquid Crystal, 2014, vol. 41, No. 11, pp. 1545-1552.

* cited by examiner

COMMON AXIS FOR OPTICAL AND ACOUSTIC SIGNALS

CROSS REFERENCE TO RELATED APPLICATIONS

This application claims priority to pending U.S. non-provisional patent application Ser. No. 16/912,450 filed Jun. 25, 2020, which claims priority to U.S. provisional patent application No. 62/867,163 filed Jun. 26, 2019. application Ser. Nos. 16/912,450 and 62/867,163 are incorporated by reference herein.

BACKGROUND INFORMATION

Imaging devices are used in contexts such as healthcare, navigation, and security, among others. Imaging systems often measure radio waves or light waves to facilitate imaging. Imaging that measures light scattered by an object is especially challenging and advances to the devices, systems, and methods to improve optical imaging are sought to increase speed, increase resolution, improve accuracy, reduce size and/or reduce cost.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1A:
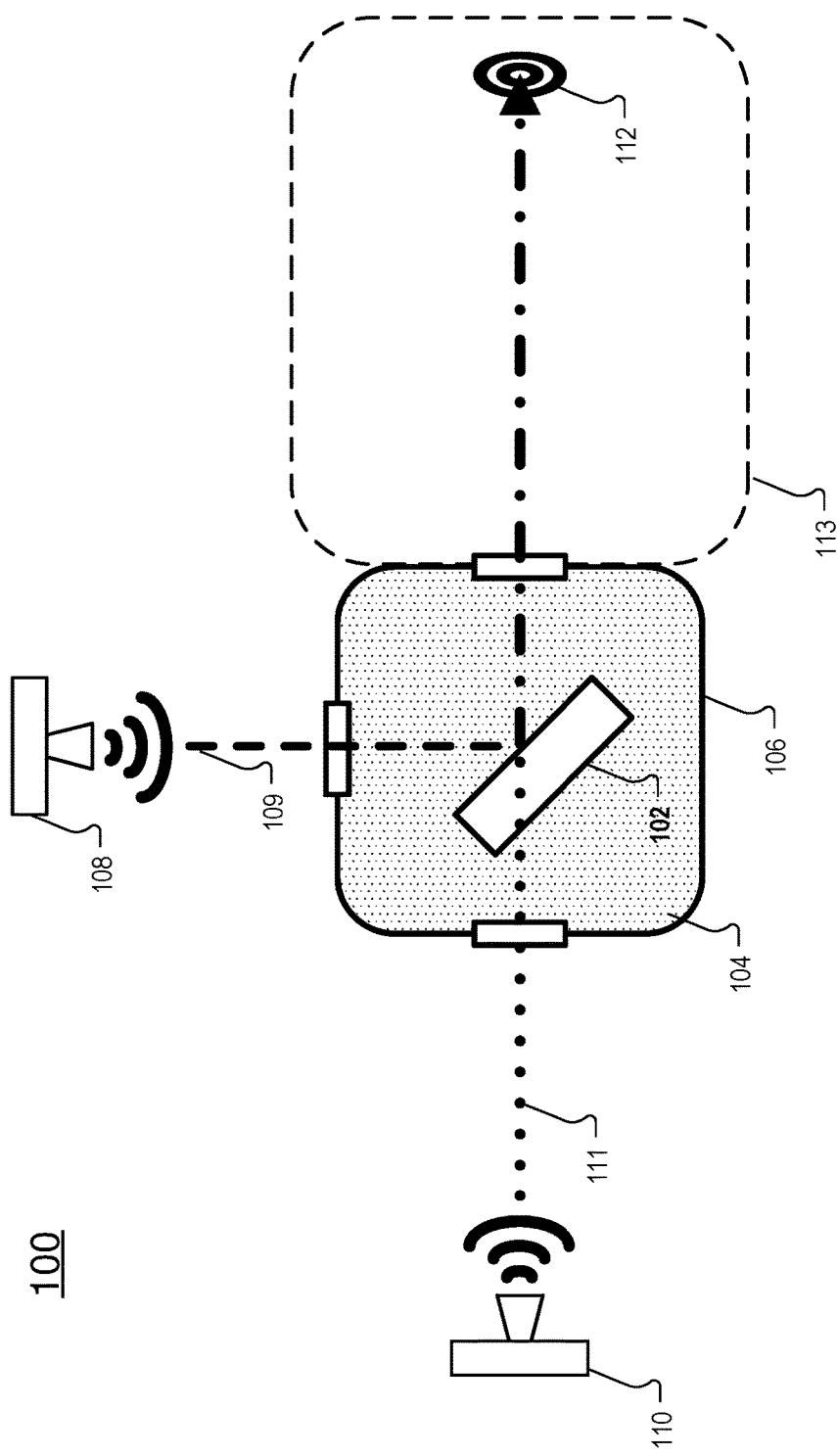
FIGS. 1A-1B illustrate an example apparatus that includes a glass element, index matching fluid, an enclosure, an ultrasound emitter, and an illumination source, in accordance with an embodiment of the disclosure.

Embodiments of an apparatus, system, and method for directing optical and acoustic signals are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

This disclosure will generally describe imaging a diffuse medium in the context of human tissue, however, the content of this disclosure may be applied to medical imaging (human or veterinary), agricultural, navigation, security, scientific research, industrial, or other contexts that image diffuse mediums or objects.

Human tissue is translucent to infrared light and to at least some wavelengths of visible light, although different parts of the human body (e.g. skin, blood, bone) exhibit different absorption coefficients. Researchers have attempted to use the properties of infrared light for medical imaging purposes, but size and cost constraints have been prohibitive for wide-scale adoption. Illuminating tissue and other diffuse mediums with visible light and near-infrared light for imaging purposes is sometimes referred to as Diffuse Optical Tomography. In one Diffuse Optical Tomography technique, time-of-flight (TOF) imaging can theoretically be employed by measuring the time it takes for "ballistic" photons (those photons that are not scattered) to pass through tissue. Since the ballistic photons reach the sensor the fastest, they are the least scattered (have the shortest optical path) and thus some conclusion can be drawn to create an image of the tissue that is illuminated by infrared light. However, TOF imaging generally requires specialty hardware (e.g. picosecond pulsed lasers and single photon detectors) to facilitate ultra-fast shutters on sensors that are able to image at the speed of light and the systems are overall very expensive and bulky. TOF imaging also requires an input of approximately 10-100 fold (or more) light intensity into the body than is received at the detector. Thus, efficacy and power limitations as well as safety limits on input intensity limit TOF imaging resolution, imaging depth and utility.

In contrast to TOF imaging, some embodiments of the disclosure may illuminate a diffuse medium (e.g. tissue) with an infrared illumination light. An infrared image of an interference of an infrared reference beam and an infrared exit signal may be captured while the infrared illumination light is illuminating the diffuse medium. The holographic infrared image may be captured by an image sensor, for example. The infrared exit signal is a portion of the infrared illumination light that exits the diffuse medium.

Holographic infrared images may be captured while an ultrasonic signal is directed to (or focused to) particular voxels in a diffuse medium such as tissue. The ultrasonic signal focused to the voxel will wavelength-shift a portion of the infrared illumination light that is propagating through the particular voxel to have an infrared wavelength that is slightly different than the narrow-band infrared wavelength of the infrared illumination light. An image sensor may capture an interference pattern of the wavelength-shifted light interfering with an infrared reference beam that has a same wavelength as the wavelength-shifted light. Applicant has utilized techniques that include directing an ultrasonic signal to a particular voxel and then capturing the interference of the wavelength-shifted portion of the infrared illumination light from that pixel. In other words, the amount of wavelength-shifted light for a particular voxel is measured. In that technique, the wavelength-shifted light and the infrared reference beam are the same wavelength, but the wavelength-shifted infrared light is a different wavelength than the infrared illumination light.

Such implementations may use an ultrasound emitter for providing the ultrasonic signal directed through the diffuse tissue to the particular voxel, an illumination source for providing the infrared illumination light directed through the diffuse tissue to the particular voxel, and an image sensor for capturing holographic infrared images of the interference of the infrared reference beam and the infrared exit signal scattered by the particular voxel. The foregoing implicates as many as three separate emissions into and/or out of the diffuse tissue: (1) the ultrasonic signal to the particular voxel, (2) the infrared illumination light to the particular voxel, and (3) the infrared exit signal scattered from the particular voxel. Applicant discloses herein systems, apparatuses, and methods which provide for an interface of an apparatus with diffuse tissue at a single location and facilitate ingress and egress of the foregoing three separate emissions through that single interface location. These embodiments and others will be described in more detail with references to FIGS. 1A-5.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. For the purposes of the disclosure, visible light has a wavelength from approximately 400 nm to 700 nm and infrared light has a wavelength from approximately 700 nm to 1 mm. Near-infrared light has a wavelength from approximately 700 nm to 1400 nm.

Figure 1B:
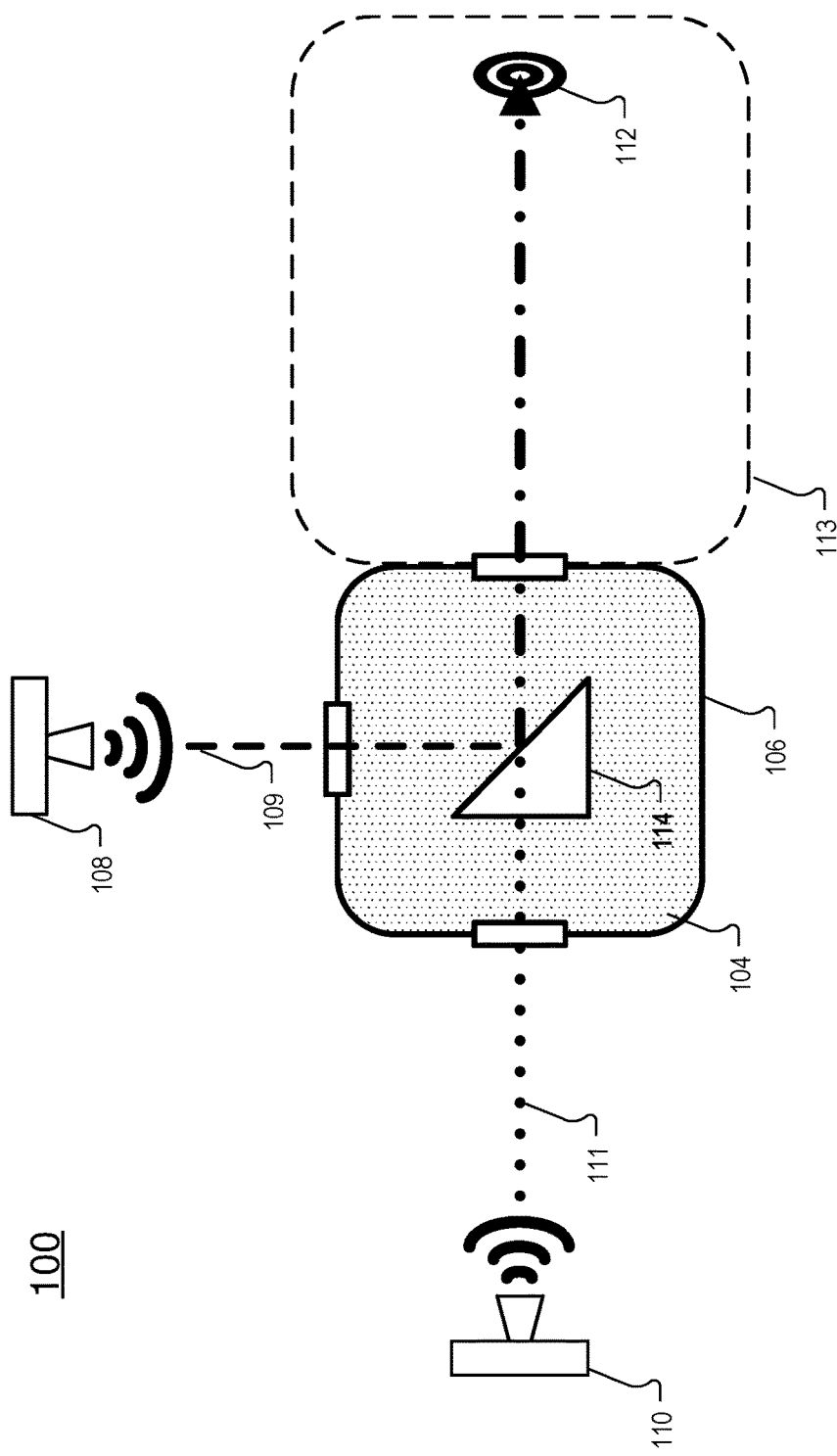

FIGS. 1A-1B illustrate an example apparatus that includes a glass element, index matching fluid, an enclosure, an ultrasound emitter, and an illumination source, in accordance with an embodiment of the disclosure. Apparatus 100 includes the glass element 102 or 114 being immersed in index matching fluid 104 that is contained by enclosure 106. In FIG. 1A, the glass element is depicted as a glass slab 102. In FIG. 1B, the glass element is depicted as a glass prism 114. (Other optical structures may be used in place of the glass element; depictions and discussion of the glass slab or glass prism as the glass element herein are exemplary only.) The glass element 102 has a first refractive index. The index matching fluid 104 has a second refractive index that is approximately the same as the first refractive index.

Proximate to the enclosure 106 is ultrasound emitter 108 and illumination source 110. At least a portion of the ultrasound emitter 108 may be in physical contact with the enclosure 106 and/or the index matching fluid 104 contained by enclosure 106. Specifically, while the ultrasound emitter 108 is depicted in the figures as being remote from the index matching fluid 104 for ease of illustration, at least a portion of the ultrasound emitter 108 that emits sound waves will be in fluid communication with the index matching fluid 104. In other words, the ultrasound emitter 108 may need to be contacting the index matching fluid 104 to facilitate transfer of the acoustic energy in the ultrasound signal. The ultrasound emitter 108 (which may be a plane wave ultrasound, phased array ultrasound, or other suitable variant) emits an ultrasonic signal 109 (i.e. sound waves) into the index matching fluid 104. The ultrasonic signal 109 propagates through the index matching fluid 104. The glass element 102 at least partially reflects the propagating sound waves that comprise the ultrasonic signal 109 out of the enclosure 106. The reflection of the sound waves takes place due to the difference in acoustic density between the index matching fluid 104 and the glass element 102 that is immersed in the index matching fluid 104. Further, the glass element 102, which may be a flat glass plate, a glass slab, or a glass prism (which may be a right angle prism or prism of some other shape), has a thickness selected to prevent deforming of the glass that might otherwise occur during interaction with sound waves such as ultrasonic signal 109.

The illumination source 110 emits infrared light 111 into the index matching fluid 104, through the glass element 102, through the index matching fluid 104 and out of the enclosure 106. As with ultrasound emitter 108, at least a portion of the illumination source 110 may be in physical contact with enclosure 106 and/or the index matching fluid 104 contained by enclosure 106. As noted above, the index matching fluid 104 has a second refractive index that is approximately the same as the first refractive index. The second refractive index is selected to match the first refractive index to significantly reduce or even eliminate reflection or refraction that the glass element 102 would otherwise impose on the infrared light 111 due to a change in refractive index at the interface of the index matching fluid 104 and the glass element 102. Through immersion of the glass element 102 in the index matching fluid 104, the glass element 102 is therefore effectively rendered inoperable as to the infrared light 111 and/or is transparent to the infrared light 111 (while remaining highly reflective to sound waves such as ultrasonic signal 109). Thus, the infrared light 111 propagates—without a change in direction—along an optical path into the index matching fluid 104, through the glass element 102, through the index matching fluid 104, and out of the enclosure 106 into diffuse medium 113. Meanwhile, the ultrasonic signal 109 emitted by the ultrasound emitter 108 and propagating through the index matching fluid 104 is reflected by the glass element 102, altering the path of the ultrasonic signal 109 out of the enclosure 106 along the substantially similar path to that of the infrared light 111.

Upon encountering the glass element 102, the ultrasonic signal 109 emitted by the ultrasound emitter 108 and the infrared light 111 emitted by the illumination source 110 travel a substantially similar path out of the enclosure 106 in the direction of a target 112. The path of the ultrasonic signal 109 to the glass element 102 is represented in FIGS. 1A-1B by a line having a dash-dash-dash depiction. The path of the infrared light 111 to the glass element 102 is represented in FIGS. 1A-1B by a line having a dot-dot-dot depiction. The paths of the ultrasonic signal 109 and the infrared light 111 past the glass element 102 are represented in FIGS. 1A-1B by a line having a dash-dot-dash-dot depiction. While light 111 is referred to as "infrared light" throughout the disclosure, in some embodiments, light 111 may have a visible light wavelength such as 650 nm. Light 111 may be between 650 nm and 850 nm. Light 111 may be laser light having a very narrow linewidth. In non-medical contexts, other wavelengths (in addition to red light and near-infrared light) may be used as light 111.

None of the dash-dash-dash depiction, the dot-dot-dot depiction, and/or the dash-dot-dash-dot depiction in FIGS. 1A-1B is intended to convey any meaning related to the shape of the waveform or any other characteristic of the ultrasonic and/or infrared emissions other than the path. Additionally, the single dash-dot-dash-dot depiction is intended only to convey that the paths of the two emissions past the glass element 102 and to the outside interface of the enclosure 106 in the direction of the target are substantially similar; no meaning is intended to be conveyed by the line depictions relating to any combining of, or interaction by, the two emissions.

In some embodiments, the glass element 102 is supported in place within the enclosure 106 and within the index matching fluid 104 by structure capable of immobilizing the glass element 102 without the structure interfering with the travel path of the ultrasonic signal 109 or infrared light 111. Such structure may include, for example, a portion of the enclosure 106 itself.

Accordingly, an apparatus 100 may be configured to permit ingress of ultrasonic and infrared beams emitted by ultrasound and illumination emitters in disparate locations relative to and outside the enclosure 106, while facilitating egress of the different beams towards the interface leading outside of the enclosure 106 in a substantially similar path of travel. In some configurations, the ultrasonic signal 109 may be reflected by the glass element 102, and its path may thereby become co-located and/or coaxial with the optical path of the infrared light 111. The enclosure 106 may be situated next to a diffuse medium 113 in which a target 112 is present. Thus, the ultrasonic and infrared beams 109 and 111 may converge outside the enclosure at the target 112 inside the diffuse medium 113 despite the beams having originated from the disparately-located emitters.

An exemplary application of the apparatus 100 may include visualization in turbid media such as diffuse, partially translucent tissue, in which individual locations within the diffuse tissue are visualized sequentially. Diffuse media other than tissue may similarly be visualized. The ultrasonic signal 109 and infrared light 111 may converge on a particular location within the diffuse medium 113, that location being referenced as a voxel (volumetric pixel), such as target 112 within diffuse medium 113 depicted in FIGS. 1A-1B. In the exemplary application, the voxel is illuminable through the diffuse medium (such as partially translucent tissue) by infrared light 111 originating from an illumination source (such as illumination source 110). The voxel is simultaneously targeted by an ultrasonic signal 109 originating from an ultrasound emitter (such as ultrasound emitter 108) and conveyed through the index matching fluid 104 and the diffuse medium 113 to the voxel (target 112 e.g.). Using the apparatus 100 disclosed herein, the illumination source 110 and ultrasound emitter 108 may be disparately located yet the respective infrared light 111 and ultrasonic signal 109 can enter the surface of the diffuse medium 113 at approximately the same location. The index matching fluid 104 contained by the enclosure 106 therefore serves as both a conveyance for the ultrasonic signal 109, particularly where the enclosure 106 interfaces with the diffuse medium 113, and a means for rendering the glass element 102 effectively transparent to the infrared light 111. Interaction of the infrared light 111 and ultrasonic signal 109 at the target 112 may facilitate visualization and/or sensing of other characteristics of the voxel (i.e. target 112) of the diffuse medium 113.

While the ultrasound emitter 108 and the illumination source 110 are depicted in FIGS. 1A-1B as being a distance away from the enclosure 106, it may be that portions of the ultrasound emitter 108 and/or the illumination source 110 are affixed to, coupled with, or otherwise proximate to the enclosure 106. Such a configuration would not modify the principle of operation of the apparatus 100. All that is necessary is that the ultrasound emitter 108 and/or the illumination source 110 are located such that they are capable of directing their emissions into the enclosure 106. Further, the enclosure 106 itself may be entirely transparent to facilitate ingress and egress of the infrared light 111, for example, or the enclosure 106 may have windows or membranes at locations on its exterior surfaces for facilitating ingress and egress with minimal distortion or attenuation of the emissions. In an embodiment, such membranes or windows would be compatible with typical ultrasound gels and sterilization methods. In some embodiments, enclosure 106 allows for possible thermal expansion; without such accommodation, seals or adhesives used in conjunction with membranes, windows or other interfaces to the enclosure could leak and/or fail.

As the index matching fluid 104 may have a high cost, in some embodiments enclosure 106 contains the smallest volume of index matching fluid possible. In some embodiments, the index matching fluid is selected to closely match the index of the prism. In an exemplary embodiment, a BK-7 glass prism having an index of ~1.52 is implemented as glass element 102. Cargille Laboratories (www.cargille.com) is an example manufacturer of specific index matching oils which can be chosen for use as index matching fluid 104 to closely fit the index of BK-7 glass used in the exemplary embodiment as glass element 102. In other embodiments, simple mineral oil may be a close enough match for use as index matching fluid 104.

Figure 2:
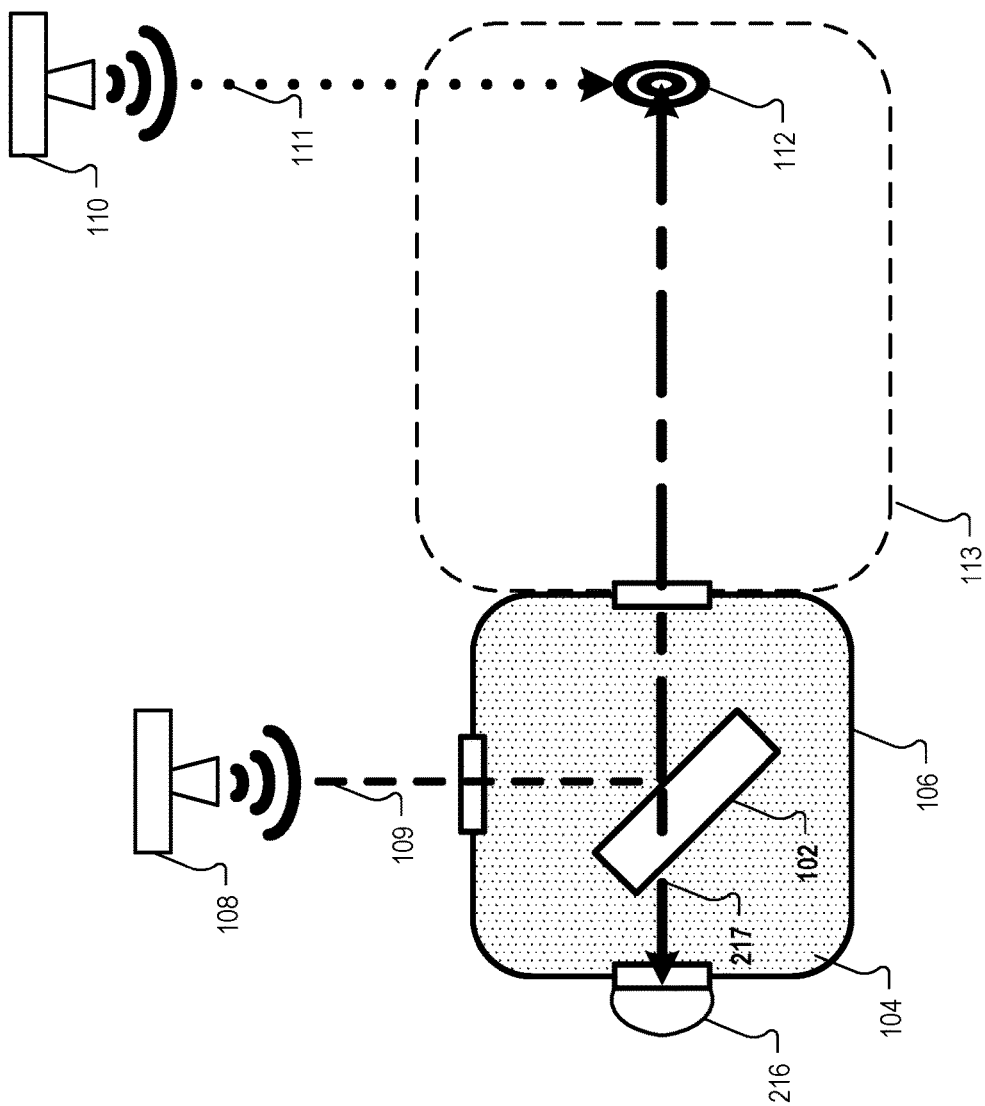
FIG. 2 illustrates an example apparatus that includes an image sensor in addition to the elements disclosed with respect to FIGS. 1A-1B, in accordance with an embodiment of the disclosure.

Waves traveling in a direction opposite to that discussed above may also pass through and/or be reflected by the glass element 102. For example, emanations from the target 112 inside the diffuse medium 113 (reflections, e.g.) may pass through the enclosure 106 and may be captured by an image sensor. In FIG. 2, an apparatus related to those depicted in FIGS. 1A-1B is shown, in which an image sensor detects light scattered by the target which has traveled an optical path through the enclosure. Apparatus 200 includes image sensor 216 capable of detecting infrared light. In some embodiments, the image sensor 216 may include a complementary metal oxide semiconductor ("CMOS") image sensor. Illumination source 110 emits infrared light 111 in the direction of target 112 inside diffuse medium 113. As in the configuration depicted in FIGS. 1A-1B, ultrasound emitter 108 emits ultrasonic signal 109 into index matching fluid 104 contained by enclosure 106, the ultrasonic signal 109 being reflected by glass element 102 out of the enclosure 106 and in the direction of the target 112 inside the diffuse medium 113.

Additionally, wavelength-shifted light 217 is generated by the ultrasonic signal 109 encountering the infrared light 111 at the target 112. The wavelength-shifted light 217 is scattered from the target 112, passes into the index matching fluid 104, through the glass element 102, and through the index matching fluid 104 where the wavelength-shifted light 217 is incident upon the image sensor 216. The optical path of the wavelength-shifted light 217 within enclosure 106 is a substantially similar path to that of the ultrasonic signal 109 exiting enclosure 106, albeit in an opposite direction. As with the apparatus depicted in FIGS. 1A-1B, the index matching fluid 104 having the second refractive index that is approximately same as the first refractive index effectively neutralizes lensing or reflective effects that the interface between index matching fluid 104 and glass element 102 would have on wavelength-shifted light 217. Thus, reflection or refraction of the wavelength-shifted light 217 from encountering glass element 102 is greatly reduced and wavelength-shifted light 217 can travel the optical path through the index matching fluid 104 and out of the enclosure 106 where it is incident upon the image sensor 216.

The path of the ultrasonic signal 109 to the glass element 102 is represented in FIG. 2 by a line having a dash-dash-dash depiction that uses short dashes. The path of the wavelength-shifted light 217 incident upon the image sensor 216 is represented in FIG. 2 by a line having a dash-dash-dash depiction that uses long dashes. The paths of the ultrasonic signal 109 and the wavelength-shifted light 217 within enclosure 106 are represented in FIG. 2 by a line having a dash-dash-dash depiction with alternating short and long dashes. The single dash-dash-dash depiction with alternating short and long dashes is intended only to convey the paths of the two waves; no meaning is intended to be conveyed by the line depictions relating to any combining of, or interaction by, the two waves.

Figure 3:
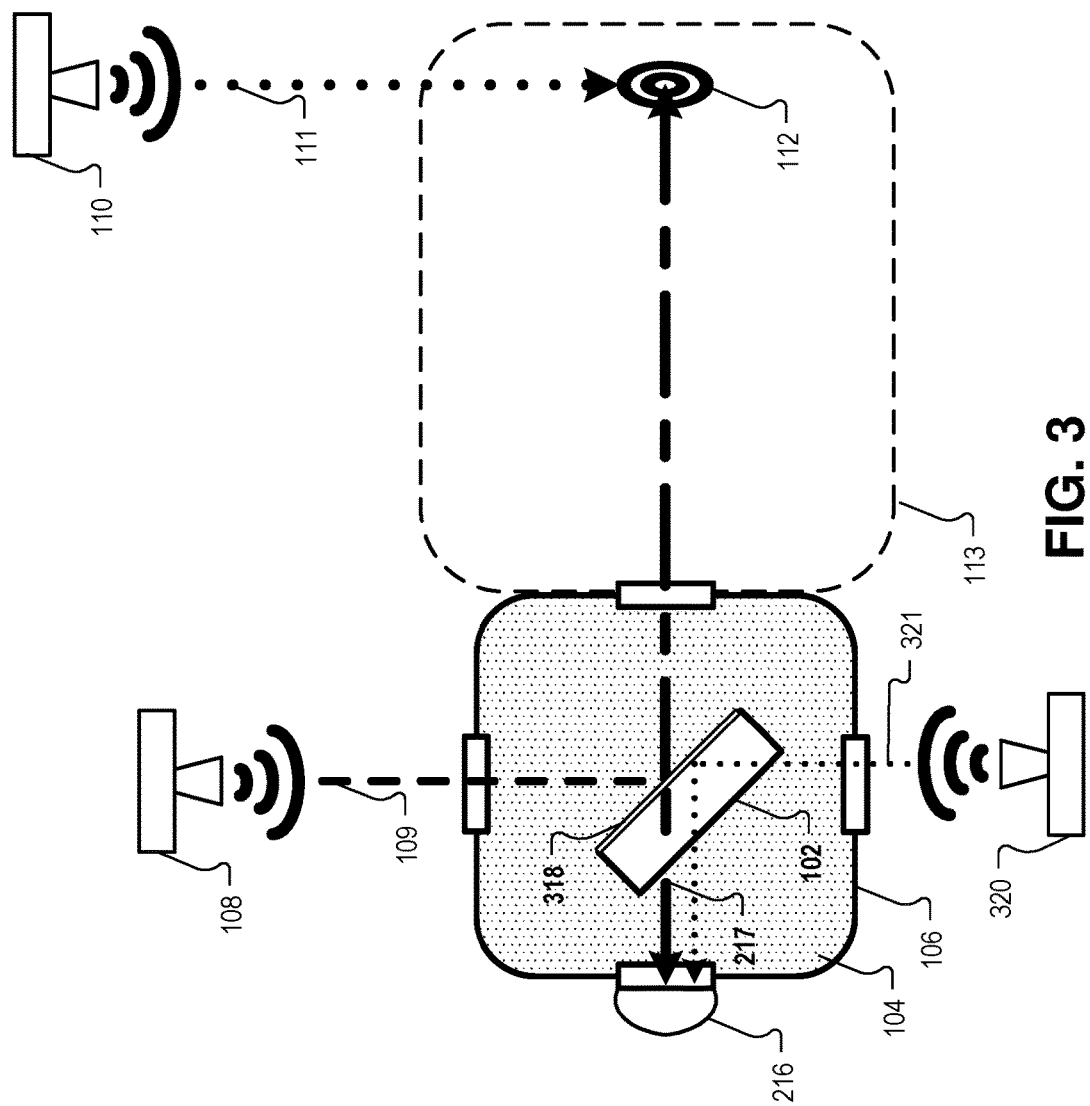
FIG. 3 illustrates an example apparatus that includes a coated glass element and a weak reference beam illumination source in addition to the elements disclosed with respect to FIGS. 1A-2, in accordance with an embodiment of the disclosure.

As discussed above, the glass element 102 is rendered effectively transparent to the infrared light 111 and the wavelength-shifted light 217 through the immersion of the glass element 102 in the index matching fluid 104. However, if some reflection by light having certain characteristics (light having a particular wavelength, e.g.) is desirable, then coatings can be applied to an exterior face of the glass element. FIG. 3 depicts an apparatus having a glass element with a coating that is configured to at least partially reflect certain light. Apparatus 300 includes the glass element 102 having coating 318 applied to an exterior face. In some embodiments, the coating may be a partial mirror or a 50/50 beam splitter operable to reflect a portion of light incident upon the coating. Other portions of light incident upon the coating may propagate through the coating and/or be lost in reflection. A reference beam source 320 emits reference beam 321 into the index matching fluid 104 towards the glass element 102, where the coating 318 applied to the glass element 102 reflects at least a portion of the reference beam 321 to image sensor 216.

The origin of the reference beam 321 may be the same as the origin of the infrared light 111 even though the reference beam 321 and infrared light 111 are emitted from two different illumination sources. For example, the illumination source 110 and the reference beam source 320 may derive their emitted light from a single laser (the single laser not being depicted herein). Additionally, while reference beam source 320 is depicted in FIG. 3 as being separate from enclosure 106 for simplicity of illustration, some or all of reference beam source 320 may be in physical contact with enclosure 106.

An exemplary application of the apparatus 300 may include imaging in turbid media such as diffuse, partially translucent tissue, in which individual locations within the diffuse tissue are imaged in a raster scanning process. Diffuse media other than tissue may similarly be imaged. Illumination source 110 is configured to direct infrared light 111 at the target 112 within diffuse medium 113, the infrared light 111 being a strong illumination beam which passes through the partially translucent diffuse medium. Ultrasound emitter 108 emits ultrasonic signal 109 into the index matching fluid 104 contained by enclosure 106. The glass element 102 reflects the ultrasonic signal 109 through the index matching fluid 104, out of the enclosure 106 and at the target 112. Upon encountering the ultrasonic signal 109, the infrared light 111 is wavelength-shifted by the ultrasonic signal 109. The wavelength-shifted light 217 is scattered by the target 112 and propagates into the index matching fluid 104, through the glass element 102, through the index matching fluid 104, and incident upon the image sensor 216. As noted above, the coating 318 applied to the glass element 102 may be operable to redirect at least a portion of the wavelength-shifted light 217 encountering the glass element such that the portion of the wavelength-shifted light 217 is directed towards the image sensor 216. The reference beam 321 (a "weak" reference beam relative to the strong illumination beam because it does not pass through the partially translucent media), which may be the same wavelength as the wavelength-shifted light 217 scattered by the target, is also incident upon the image sensor 216. The image sensor 216 captures one or more images of the wavelength-shifted light 217 scattered by the target 112 interfering with the reference beam 321.

Repeating the process of imaging the interference pattern generated by directing the ultrasonic signal 109 and infrared light 111 at different targets 112 within the diffuse medium 113 provides a raster scan of the diffuse medium 113. The raster scan can be used to derive a composite 3D image corresponding to some or all of the diffuse medium 113.

Figure 4:
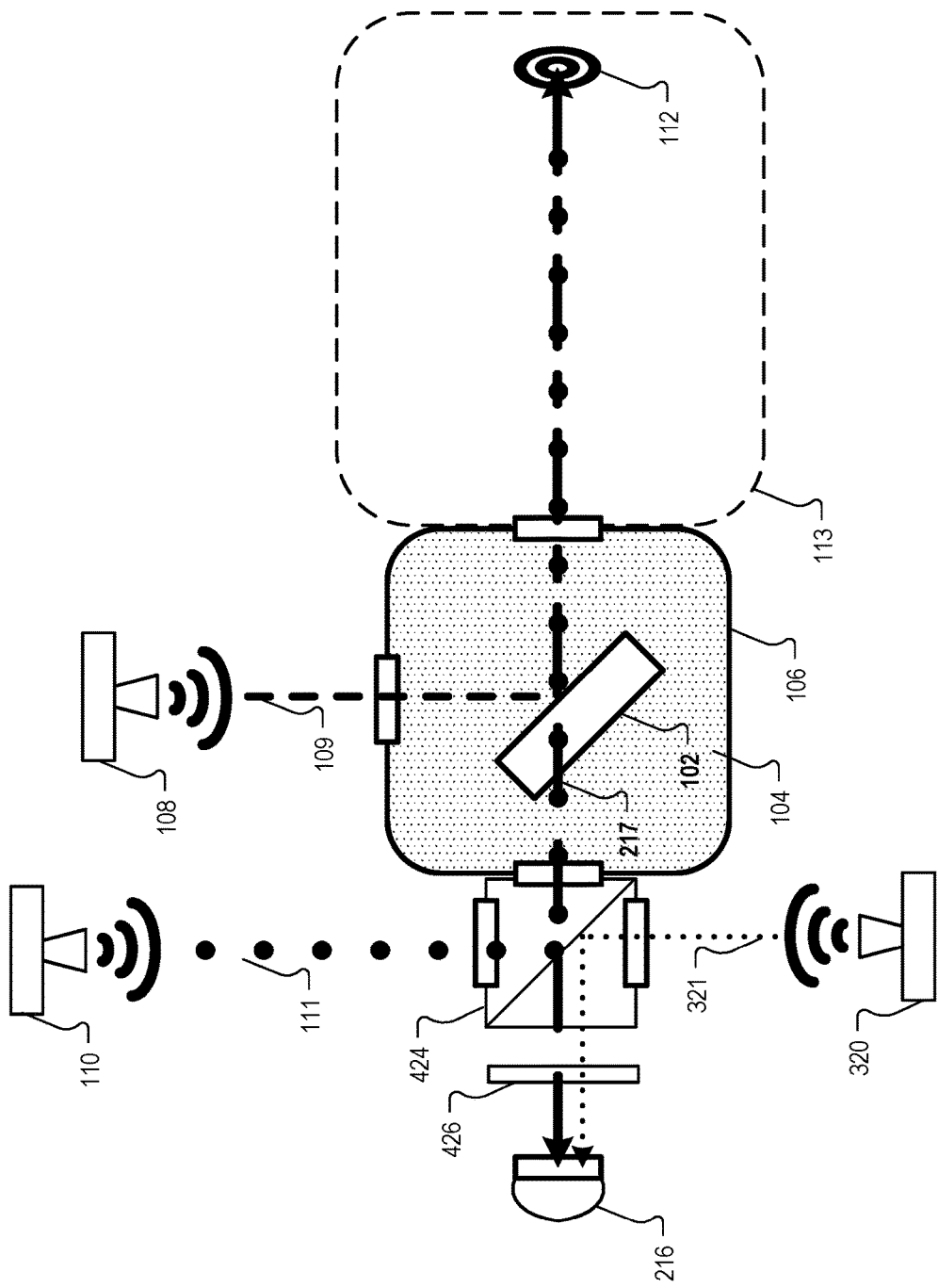
FIG. 4 illustrates an example apparatus that includes a polarizing beam splitting prism and a polarizer in addition to the elements disclosed with respect to FIGS. 1A-3, in accordance with an embodiment of the disclosure.

FIG. 4 depicts an alternate embodiment of the apparatus illustrated by FIG. 3, in which the illumination source 110 of the infrared light 111 is configured to direct the strong illumination beam (i.e. infrared light 111) through the enclosure 106 so that, like the apparatus 100 depicted in FIGS. 1A-1B, there is a single interface with the diffuse medium 113 for emitting waves into the diffuse medium 113. Like the apparatuses 200/300 depicted in FIGS. 2 and 3, that interface is also used for the wavelength-shifted light 217 scattered by the target 112, and like the apparatus 300 depicted in FIG. 3, a weak illumination beam 321 is provided such that the image sensor 216 may capture one or more images of the wavelength-shifted light 217 interfering with the weak illumination beam 321. Apparatus 400 includes a polarizing beam splitting prism 424. Illumination source 110 emits infrared light 111 (the strong illumination beam) in the direction of the polarizing beam splitting prism 424, which reflects the infrared light 111 into the enclosure 106, into the index matching fluid 104, passing through glass element 102, through the index matching fluid 104, and into diffuse medium 113 towards target 112. The optical path of the infrared light 111 is represented by the large dot dot-dot-dot pattern in FIG. 4.

Reference beam source 320 emits reference beam 321 in the direction of the polarizing beam splitting prism 424, which reflects the reference beam 321 into polarizer 426 and then towards image sensor 216. The optical path of the reference beam 321 is represented by the small dot dot-dot-dot pattern in FIG. 4.

The ultrasound emitter 108 emits ultrasonic signal 109 into the enclosure 106 and into the index matching fluid 104 whereupon the ultrasonic signal 109 is reflected by glass element 102 through the index matching fluid 104 out of the enclosure 106 and into diffuse medium 113 towards target 112 along with the infrared light 111. The path of the ultrasonic signal 109 to the glass element 102 is represented in FIG. 4 by a line having a dash-dash-dash depiction that uses short dashes.

At the target 112, the infrared light 111 is wavelength-shifted by the ultrasonic signal 109. The wavelength-shifted light is scattered by the target (i.e. wavelength-shifted light 217) into the index matching fluid 104, through the glass element 102, through the index matching fluid 104, out of the enclosure 106, and through the polarizing beam splitting prism 424. The wavelength-shifted light 217 passes through the polarizer 426, imparting to the light the same polarization as the reference beam, whereby the wavelength-shifted light 217 becomes incident upon the image sensor 216. The path of the wavelength-shifted light 217 within enclosure 106 to the image sensor is represented in FIG. 4 by a line having a dash-dash-dash pattern with alternating short and long dashes.

As discussed in relation to FIG. 3, the image sensor 216 captures one or more images of the wavelength-shifted light 217 scattered by the target 112 interfering with the reference beam 321. The apparatus thus facilitates ingress of the ultrasonic signal 109 and infrared light 111 into the diffuse medium 113 and egress of the wavelength-shifted light 217 from the diffuse medium through the same interface, even though the ultrasound and infrared emitters 108 and 110 and the image sensor 216 are located in disparate locations. Beneficially, imaging of the diffuse medium 113 may therefore occur through placement of only a single apparatus on the surface of the diffuse medium 113 itself.

Figure 5:
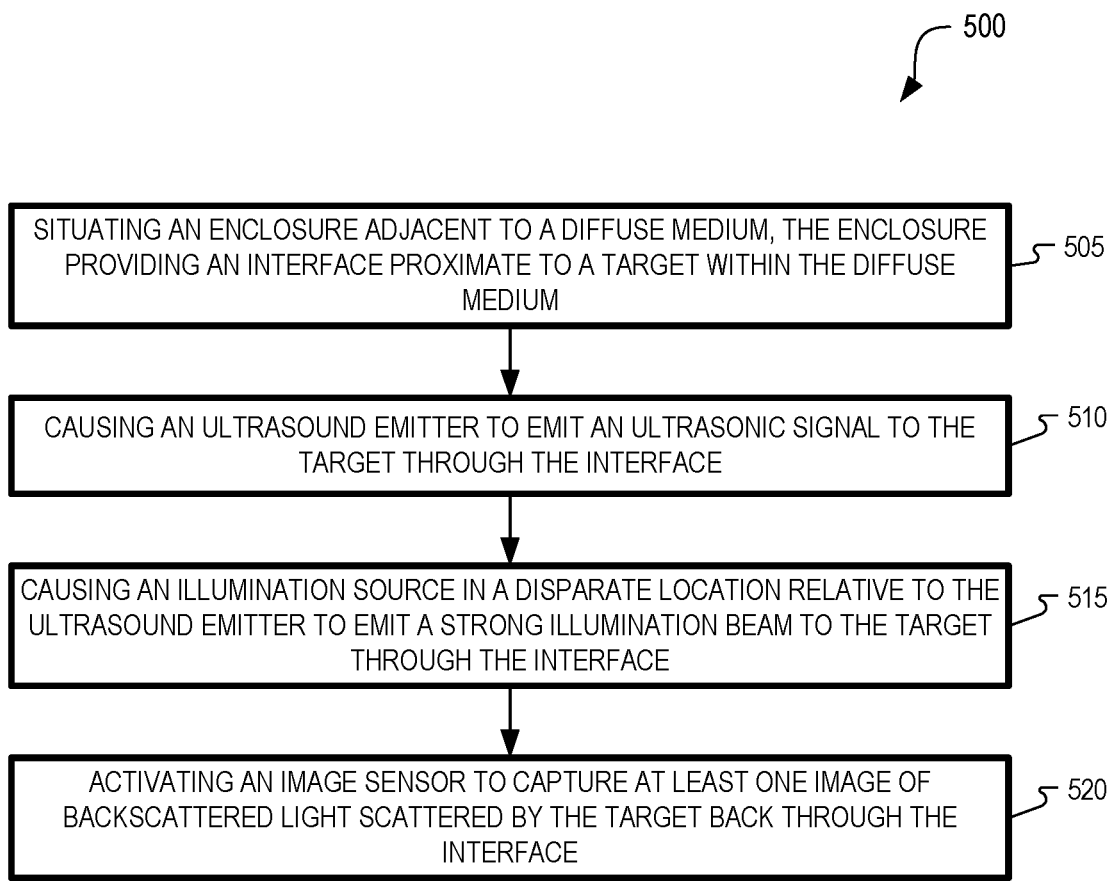
FIG. 5 illustrates an example flow chart of a process of capturing images of light scattered from a target within a diffuse medium, in accordance with an embodiment of the disclosure.

FIG. 5 illustrates an example flow chart of a process 500 of capturing images of light scattered from a target within a diffuse medium, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel. Some or all of process 500 may be executed by one or more processing devices.

In process block 505, an enclosure (e.g. enclosure 106) is situated adjacent to a diffuse medium (e.g. diffuse medium 113), the enclosure providing an interface proximate to a target (e.g. target 112) within the diffuse medium. The diffuse medium may include tissue. The target may include a voxel within the tissue desired to be imaged.

In process block 510, an ultrasound emitter (e.g. ultrasound emitter 108) emits an ultrasonic signal (e.g. ultrasonic signal 109) to the target through the interface. The enclosure may include structure (e.g. glass element 102) to at least partially reflect at least a portion of the ultrasonic signal in the direction of the interface.

In process block 515, an illumination source (e.g. illumination source 110) in a disparate location relative to the ultrasound emitter emits a strong illumination beam (e.g. infrared light 111) to the target through the interface. Upon encountering the target, the strong illumination beam may be wavelength-shifted by the ultrasonic signal. The target scatters backscattered light (e.g. wavelength-shifted light 217) in the direction of the interface.

In process block 520, an image sensor (e.g. image sensor 216) is activated to capture at least one image of backscattered light scattered by the target (e.g. wavelength-shifted light 217) back through the interface.

Process block 520 may include optional operation 525, in which the ultrasonic signal and the strong illumination beam propagate along a substantially similar optical path to the interface.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus comprising:
a glass element;
a fluid, wherein the glass element is immersed in the fluid;
an illumination source for emitting light; and
an ultrasound emitter configured to direct an ultrasonic signal through the fluid to the glass element, wherein the glass element is configured to reflect the ultrasonic signal along a substantially similar path as an optical path that the light propagates along.

2. The apparatus of claim 1, wherein the ultrasonic signal propagates in an opposite direction as the light along the substantially similar path.

3. The apparatus of claim 1, wherein the glass element has a first refractive index and the fluid is an index matching fluid having a second refractive index approximately the same as the first refractive index.

4. The apparatus of claim 1, wherein the glass element includes a coating that is configured to at least partially reflect the light.

5. The apparatus of claim 1 further comprising:
an enclosure to contain the fluid, wherein the enclosure includes an interface facilitating egress of the ultrasonic signal and the light out of the enclosure.

6. The apparatus of claim 5, wherein the glass element is configured to reflect the ultrasonic signal out of the enclosure into a diffuse medium.

7. The apparatus of claim 1 further comprising:
an image sensor configured for sensing scattered light scattered by a target into the fluid, through the glass element, through the fluid, and incident upon the image sensor.

8. The apparatus of claim 7, wherein the image sensor is configured to receive wavelength-shifted light generated by the ultrasonic signal encountering the light at the target.

9. The apparatus of claim 8, wherein the wavelength-shifted light propagates from the target, into the fluid, through the glass element, through the fluid, and incident upon the image sensor.

10. The apparatus of claim 8 further comprising:
a reference beam source for emitting a reference beam, wherein the glass element includes a coating that is configured to at least partially reflect the reference beam to be incident upon the image sensor.

11. The apparatus of claim 10, wherein the reference beam is of the same wavelength as the wavelength-shifted light.

12. The apparatus of claim 1, wherein the light emitted by the illumination source encounters the fluid prior to encountering the glass element.

13. The apparatus of claim 1, wherein the fluid is positioned to receive the light prior to the glass element.

14. An apparatus comprising:
an enclosure including an interface for permitting egress of ultrasonic and infrared emissions propagating within a portion of the enclosure along a substantially similar path to the interface, wherein the enclosure also includes an ultrasonic entry path for the ultrasonic emission and a light entry path for the infrared emission;
a glass element configured to at least partially reflect the ultrasonic emission received from the ultrasonic entry path onto the substantially similar path to the interface; and
fluid contained by the enclosure, the fluid having a first refractive index that is the same as a second refractive index of the glass element.

15. The apparatus of claim 14, wherein the glass element is immersed in the fluid.

16. The apparatus of claim 14, wherein the fluid facilitates propagation of the ultrasonic emission through the enclosure.

17. The apparatus of claim 14, wherein the glass element includes a coating that is configured to at least partially reflect the infrared emission.

18. The apparatus of claim 17, wherein the infrared emission is near-infrared light.

19. The apparatus of claim 14, wherein the fluid is positioned to receive the ultrasonic emission prior to the glass element.

20. A method comprising:
- situating an enclosure adjacent to a diffuse medium, the enclosure providing an interface proximate to a target within the diffuse medium, wherein the enclosure includes a glass element;
- causing an ultrasound emitter to emit an ultrasonic signal; and
- causing an illumination source in a disparate location relative to the ultrasound emitter to emit a strong illumination beam,
- wherein the glass element is configured to reflect the ultrasonic signal to the target along a substantially similar path as an optical path that the strong illumination beam propagates along, and wherein the ultrasonic signal encounters a fluid contained by the enclosure prior to encountering the glass element.

* * * * *